US009488902B2

(12) United States Patent
Akiyama

(10) Patent No.: US 9,488,902 B2
(45) Date of Patent: Nov. 8, 2016

(54) ILLUMINATOR AND PROJECTOR

(75) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 632 days.

(21) Appl. No.: 13/213,643

(22) Filed: Aug. 19, 2011

(65) Prior Publication Data

US 2012/0051044 A1    Mar. 1, 2012

(30) Foreign Application Priority Data

Aug. 27, 2010   (JP) ................................. 2010-190445

(51) Int. Cl.
| G03B 21/20 | (2006.01) |
| G03B 33/06 | (2006.01) |
| G03B 33/12 | (2006.01) |
| H04N 9/31 | (2006.01) |
| G02B 27/48 | (2006.01) |
| G02B 5/32 | (2006.01) |

(52) U.S. Cl.
CPC ............. *G03B 21/208* (2013.01); *G02B 27/48* (2013.01); *G03B 21/204* (2013.01); *G03B 21/2013* (2013.01); *G03B 21/2033* (2013.01); *G03B 33/06* (2013.01); *G03B 33/12* (2013.01); *H04N 9/3105* (2013.01); *H04N 9/3152* (2013.01); *H04N 9/3164* (2013.01); *G02B 5/32* (2013.01)

(58) Field of Classification Search
USPC ................................ 362/233, 311.02, 311.12
See application file for complete search history.

(56) References Cited

U.S. PATENT DOCUMENTS

| 5,584,569 | A | * | 12/1996 | Huang ........................ 362/288 |
| 5,626,410 | A | * | 5/1997 | Chambers et al. ............. 353/94 |
| 6,081,381 | A | | 6/2000 | Shalapenok et al. |
| 8,246,216 | B2 | * | 8/2012 | Jiang et al. .................... 362/308 |
| 2001/0033335 | A1 | * | 10/2001 | Kubota et al. ................. 348/270 |
| 2002/0149949 | A1 | * | 10/2002 | Hsieh et al. ................... 362/555 |
| 2004/0207818 | A1 | | 10/2004 | Stahl |
| 2005/0128582 | A1 | | 6/2005 | Gibilini |
| 2005/0270775 | A1 | | 12/2005 | Harbers et al. |
| 2006/0146297 | A1 | | 7/2006 | Lee |
| 2006/0181866 | A1 | * | 8/2006 | Jung et al. ....................... 362/97 |

(Continued)

FOREIGN PATENT DOCUMENTS

| CN | 1800965 A | 7/2006 |
| CN | 1928701 A | 3/2007 |

(Continued)

OTHER PUBLICATIONS

Jan. 15, 2016 US office action issued in U.S. Appl. No. 14/879,558.

(Continued)

*Primary Examiner* — Sharon Payne
(74) *Attorney, Agent, or Firm* — Oliff PLC

(57) ABSTRACT

An illuminator includes a (solid-state light source array) including a plurality of solid-state light sources, a light collecting system that collects light from the solid-state light source group at a predetermined light collection position, a collimator system disposed on the opposite side of the light collection position to the light collecting system and substantially parallelizing light from the light collecting system, and an integrator system that homogenizes the in-plane light intensity distribution of light from the collimator system. The illuminator further includes a transmissive diffusing unit that is disposed in the vicinity of the light collection position and transmits the light from the light collecting system while diffusing the light from the light collecting system.

19 Claims, 13 Drawing Sheets

(56) References Cited

U.S. PATENT DOCUMENTS

| | | |
|---|---|---|
| 2007/0058133 A1 | 3/2007 | Totani |
| 2008/0055903 A1 | 3/2008 | Akiyama |
| 2008/0111973 A1 | 5/2008 | Aruga |
| 2009/0040467 A1 | 2/2009 | Yamauchi et al. |
| 2009/0284713 A1 | 11/2009 | Silverstein et al. |
| 2009/0296407 A1* | 12/2009 | Bailey ........................... 362/309 |

FOREIGN PATENT DOCUMENTS

| | | | |
|---|---|---|---|
| CN | 101063520 A | 10/2007 | |
| CN | 101363967 A | 2/2009 | |
| EP | 0 348 137 | * 12/1989 | ............... F24C 7/00 |
| JP | S61-275635 A | 12/1986 | |
| JP | A-2004-327361 | 11/2004 | |
| JP | A-2005-099160 | 4/2005 | |
| JP | A-2005-347263 | 12/2005 | |
| JP | A-2007-033577 | 2/2007 | |
| JP | A-2008-096777 | 4/2008 | |
| JP | A-2009-169012 | 7/2009 | |

OTHER PUBLICATIONS

Jun. 21, 2016 Office Action Issued in U.S. Appl. No. 14/879,558.

* cited by examiner

ILLUMINATOR AND PROJECTOR

BACKGROUND

1. Technical Field

The present invention relates to an illuminator and a projector.

2. Related Art

There has been a known illuminator including: a solid-state light source group formed of a plurality of solid-state light sources that produce excitation light and outputting the excitation light toward a predetermined light collection position; a phosphor layer that positions in the vicinity of the light collection position and produces fluorescence light when excited with the excitation light from the solid-state light source group; a collimator system that substantially parallelizes the light from the phosphor layer; and a lens integrator system that homogenizes the in-plane light intensity distribution of the light from the collimator system. There has also been a known projector including the illuminator (see JP-A-2004-327361, for example). The illuminator of the related art, which uses the excitation light produced by the plurality of solid-state light sources to produce fluorescence light, can produce high-intensity illumination light. Further, the illuminator of the related art, which includes a lens integrator system that uses light very efficiently as an optical integration system, can use light very efficiently to produce illumination light with little brightness unevenness.

The "lens integrator system" used herein is an optical integration system including a first lens array, a second lens array, and a superimposing lens. The lens integrator system, in which the first lens array divides light into a plurality of sub-light fluxes, and the second lens array and the superimposing lens superimpose the plurality of sub-light fluxes on an illuminated surface, can homogenize the in-plane light intensity distribution of the light.

The illuminator of the related art, which uses the excitation light produced by the plurality of solid-state light sources to produce fluorescence light, has a problem of a short life of the phosphor layer because a large thermal load is applied to the phosphor layer. There has been therefore a demand in the art of illuminator to use the light from a plurality of solid-state light sources as illumination light without using any phosphor layer. When the light from a plurality of solid-state light sources is used as illumination light without any phosphor layer, the light from each of the solid-state light sources is incident on a lens integrator system in the form of spot-shaped light because each of the solid-state light sources substantially can be considered as a point light source. Any lens integrator system, however, cannot homogenize the in-plane light intensity distribution of such spot-shaped light in a satisfactory manner, and the configuration of the illuminator of the relate art is therefore problematic in that producing high-intensity illumination light and producing illumination light with high efficiency along with little brightness unevenness cannot be satisfied at the same time.

SUMMARY

An advantage of some aspects of the invention is to provide an illuminator capable of satisfying both of the following requirements: producing high-intensity illumination light and producing the illumination light with high efficiency along with little brightness unevenness. Another advantage of some aspects of the invention is to provide a projector capable of projecting a projection image of high intensity with little brightness unevenness.

[1] An illuminator according to a first aspect of the invention includes a solid-state light source group including a plurality of solid-state light sources, a light collecting system that collects light from the solid-state light source group at a predetermined light collection position, a collimator system disposed on the opposite side of the light collection position to the light collecting system, transmissive diffusing unit disposed in the vicinity of the light collection position, the transmissive diffusing unit transmitting light from the light collecting system while diffusing the light, and a lens integrator system on which light having passed through the transmissive diffusing unit is incident.

Since the illuminator according to the first aspect of the invention includes the solid-state light source group including a plurality of solid-state light sources and the transmissive diffusing unit that transmits the light from the light collecting system while diffusing the light, spot-shaped light can be diffused and then delivered to the lens integrator system, whereby the illuminator can satisfy both of the following requirements: producing high-intensity illumination light and producing the illumination light with high efficiency along with little brightness unevenness.

[2] In the illuminator according to the first aspect of the invention, the transmissive diffusing unit is preferably formed of a microlens array diffuser.

Since a microlens array diffuser produces little backscattered light and has high transmittance, the configuration described above reduces the amount of light loss resulting from the use of the transmissive diffusing unit and hence further increase light use efficiency.

In the case of [2] described above, the microlens array diffuser is preferably coated with an AR coating. This configuration can further reduce the amount of backscattering and increase the light use efficiency.

In the case of [2] described above, the microlens array diffuser is preferably made of an inorganic material. This configuration can enhance heat resistance of the transmissive diffusing unit and hence make the illuminator more reliable.

Examples of the inorganic material may include optical glass, crystal, quartz, and sapphire.

In the case of [2] described above, the transmissive diffusing unit preferably has microlenses formed on both the light incident surface and exiting surface thereof. This configuration allows the transmissive diffusing unit to diffuse light to a greater extent.

The "microlens array diffuser" used herein refers to a diffuser having a function of diffusing light through a large number of microlenses.

In a microlens array diffuser, the pitch of the microlenses (distances based on which the microlenses are arranged) are preferably 40 μm or smaller from the viewpoint of diffusion uniformity but preferably 10 μm or greater from the viewpoint of productivity. The intervals between the microlenses may, of course, be smaller than 10 μm as long as they can be manufactured.

In the microlens array diffuser in the first aspect of the invention, the microlenses are preferably arranged with no gaps.

Each of the microlenses can either be a convex lens or a concave lens.

[3] In the illuminator according to the first aspect of the invention, the transmissive diffusing unit is preferably formed of a holographic diffuser.

Since a holographic diffuser also produces little backscattered light and has high transmittance, the configuration described above also reduces the amount of light loss resulting from the use of the transmissive diffusing unit and hence further increase the light use efficiency.

In the configuration described above, the holographic diffuser is preferably made of an organic material. This configuration allows the transmissive diffusing unit to be manufactured with high precision and hence perform diffusion with high precision.

Examples of the organic material may include a polycarbonate resin and an epoxy resin.

The "holographic diffuser" used herein is a diffuser having a function of diffusing light based on diffraction of light with the aid of minute grooves.

[4] In the illuminator according to the first aspect of the invention, the light having passed through the transmissive diffusing unit is preferably incident on at least 50% of an effective area of the lens integrator system.

The configuration described above can further increase the uniformity of the produced illumination light.

In the above point of view, the light having passed through the transmissive diffusing unit is more preferably incident on at least 80% of the effective area of the lens integrator system.

[5] In the illuminator according to the first aspect of the invention, each of the solid-state light sources is preferably a semiconductor laser.

Since a semiconductor laser is compact and emits high-intensity light, the configuration described above allows a compact and high-intensity illuminator to be provided. The illuminator can output more intense illumination light by arranging the plurality of solid-state light sources in a more densely manner.

[6] The illuminator according to the first aspect of the invention preferably further includes a rotary plate disposed in the vicinity of the light collecting position and rotatable around a predetermined axis of rotation by using a driver, and the transmissive diffusing unit is preferably at least so positioned on the rotary plate that the light from the light collecting system passes through the transmissive diffusing unit.

Since the above configuration allows the position where the light is incident to be moved over a wide range of the light incident surface of the transmissive diffusing unit, a thermal load applied to a unit area of the transmissive diffusing unit can be reduced, which prevents the transmissive diffusing unit from being degraded or damaged due to heat.

Since a transmissive diffusing unit made of an organic material (such as a holographic diffuser) is generally not resistant to heat, the configuration described above is particularly effective when a transmissive diffusing unit made of an organic material is used.

Further, when each of the solid-state light sources is a semiconductor laser as described above in [5], the configuration described above can reduce the amount of speckle noise in the illumination light.

[7] In the illuminator according to the first aspect of the invention, the light from the light collecting system is preferably incident on a 1×1 mm square region of the transmissive diffusing unit.

The configuration described above allows the light from the light collecting system to be incident on a sufficiently small area of the transmissive diffusing unit, whereby the amount of decrease in the light use efficiency in the illuminator resulting from the use of a plurality of solid-state light sources can be reduced.

[8] A projector according to a second aspect of the invention includes the illuminator according to the first aspect of the invention, a light modulator that modulates light from the illuminator in accordance with image information, and a projection system that projects light from the light modulator.

The projector according to the second aspect of the invention, which includes the illuminator according to the first aspect of the invention capable of satisfying both of the following requirements: producing high-intensity illumination light and producing the illumination light with high efficiency along with little brightness unevenness, can project a projection image of high intensity with little brightness unevenness.

[9] The projector according to the second aspect of the invention preferably further includes a second illuminator and a second light modulator that modulates light from the second illuminator in accordance with image information, and the second illuminator preferably includes a second solid-state light source that produces excitation light and a phosphor layer that produces fluorescence light when excited with the excitation light produced by the second solid-state light source.

The configuration described above allows a high-intensity color image formed of desired color light components to be projected.

[10] In the projector according to the second aspect of the invention, the illuminator preferably further includes a second solid-state light source that produces excitation light and a phosphor layer that produces fluorescence light when excited with the excitation light produced by the second solid-state light source.

The configuration described above also allows a high-intensity color image formed of desired color light components to be projected.

When the illuminator includes "the solid-state light source group" and the "the second solid-state light source and the phosphor layer" as described in [10], they may be paired with separate optical systems (such as lens integrator systems) or may share the same optical system.

[11] The projector according to the second aspect of the invention preferably further includes a second solid-state light source group and a third light modulator that modulates light from the second solid-state light source group in accordance with image information, and the color of the light from the second solid-state light source group preferably differs from the color of the light from the solid-state light source group.

The configuration described above also allows a high-intensity color image formed of desired color light components to be projected.

When the illuminator includes a plurality of solid-state light source groups as described in [11], they may be paired with separate optical systems (such as lens integrator systems) or may share the same optical system.

BRIEF DESCRIPTION OF THE DRAWINGS

The invention will be described with reference to the accompanying drawings, wherein like numbers reference to like elements.

DESCRIPTION OF EXEMPLARY EMBODIMENTS

An illuminator and a projector according to embodiments of the invention will be described below with reference to the drawings.

First Embodiment

Figure 1:
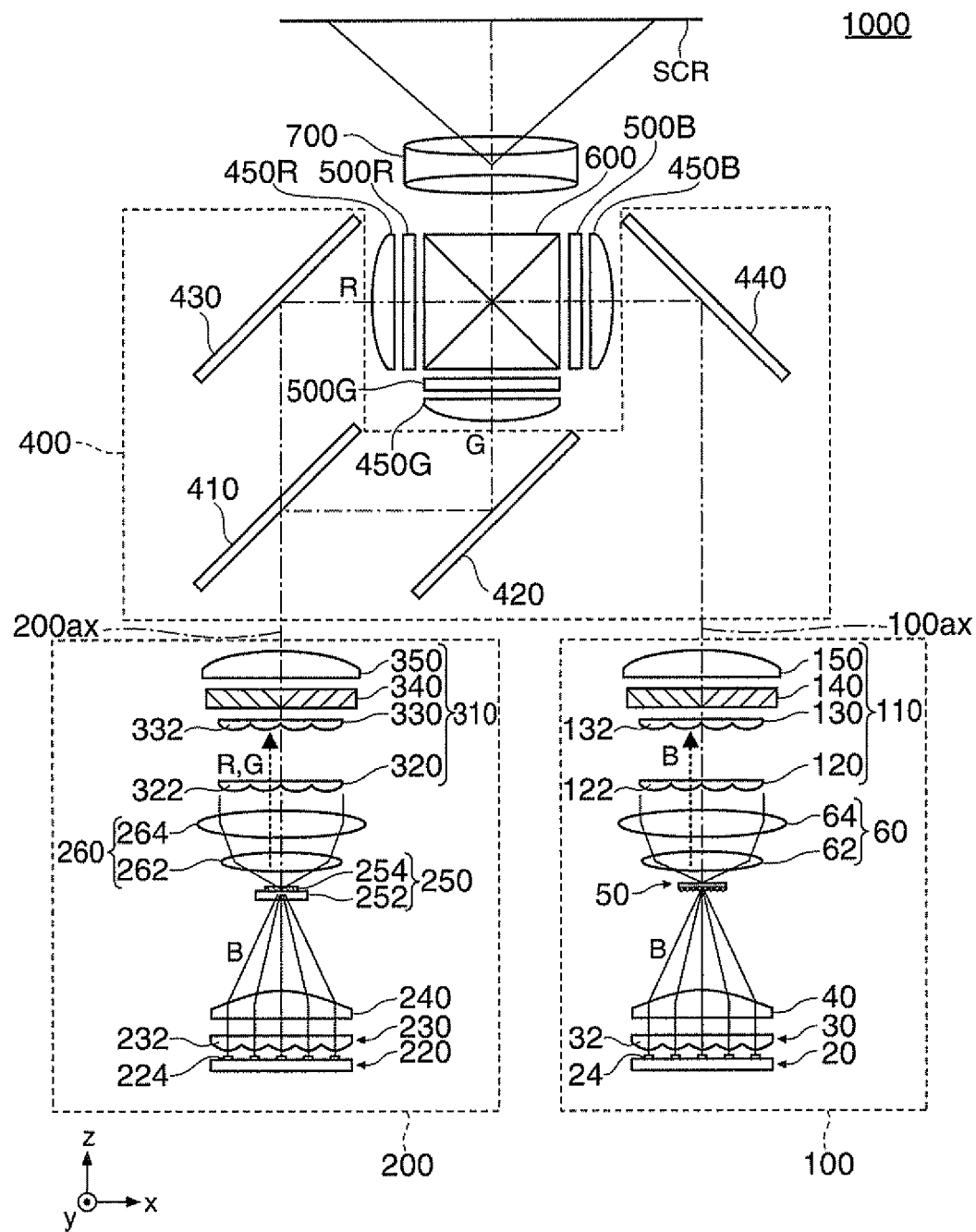
FIG. 1 is a plan view showing the optical system of a projector according to a first embodiment.

FIG. 1 is a plan view showing the optical system of a projector 1000 according to a first embodiment.

Figure 2:
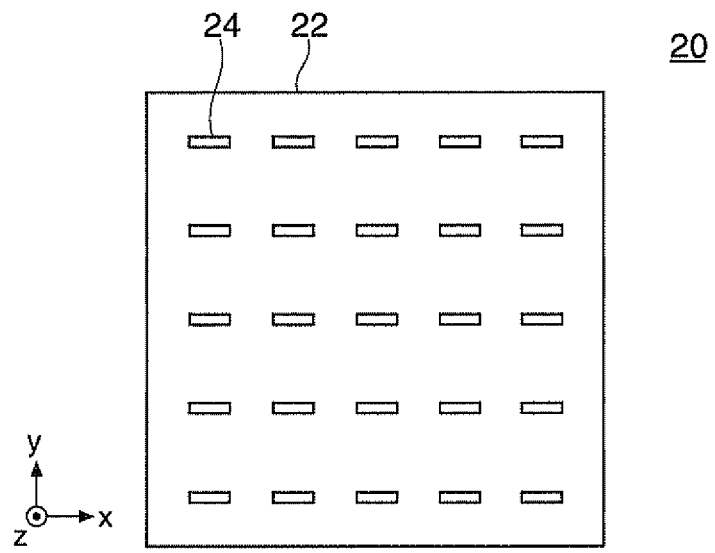
FIG. 2 shows a solid-state light source array in the first embodiment viewed from the side where a collimator lens array is present.

FIG. 2 shows a solid-state light source array 20 in the first embodiment viewed from the side where a collimator lens array 30 is present.

Figure 3A:
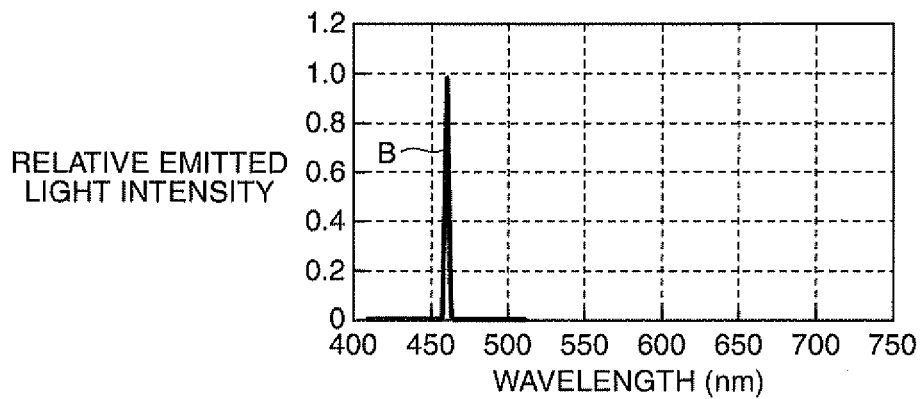
FIGS. 3A to 3C show graphs illustrating intensity characteristics of light emitted from a solid-state light source, a second solid-state light source, and a fluorophore in the first embodiment, respectively.
Figure 3B:
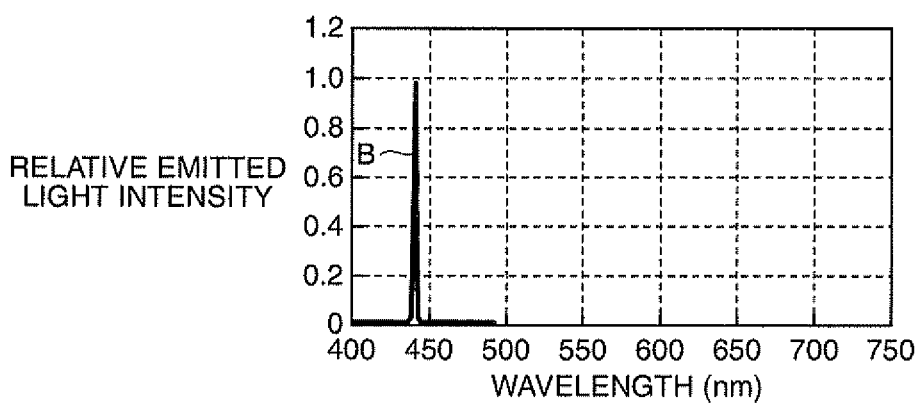
Figure 3C:
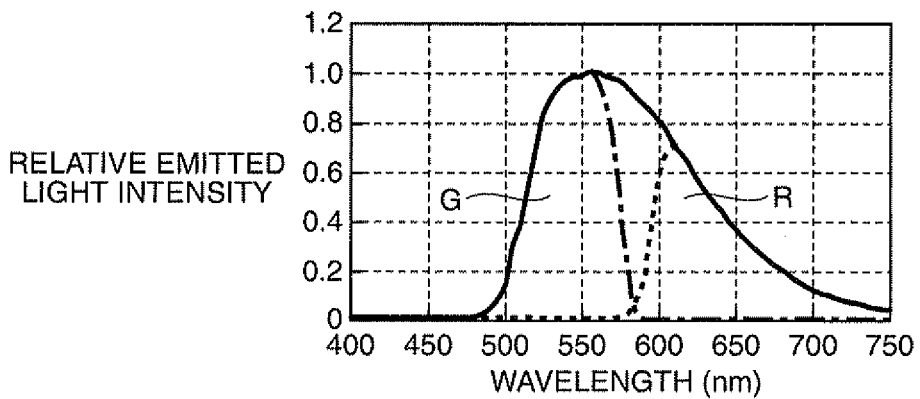

FIGS. 3A to 3C show graphs illustrating intensity characteristics of light emitted from a solid-state light source 24, intensity characteristics of light emitted from a second solid-state light source 224, and intensity characteristics of light emitted from a phosphor in the first embodiment, respectively. FIG. 3A shows a graph illustrating the intensity characteristics of light emitted from the solid-state light source 24. FIG. 3B shows a graph illustrating the intensity characteristics of light emitted from the second solid-state light source 224. FIG. 3C shows a graph illustrating the intensity characteristics of light emitted from a phosphor contained in a phosphor layer 254. The emitted light intensity characteristic used herein tells the wavelength and intensity of light emitted from a light source when a voltage is applied thereto or light emitted from a fluorophore when excitation light is incident thereon. The vertical axis in FIGS. 3A to 3C represents relative emitted light intensity, and a maximum emitted light intensity at a certain wavelength is normalized to one. The horizontal axis in FIGS. 3A to 3C represents the wavelength.

Figure 4:
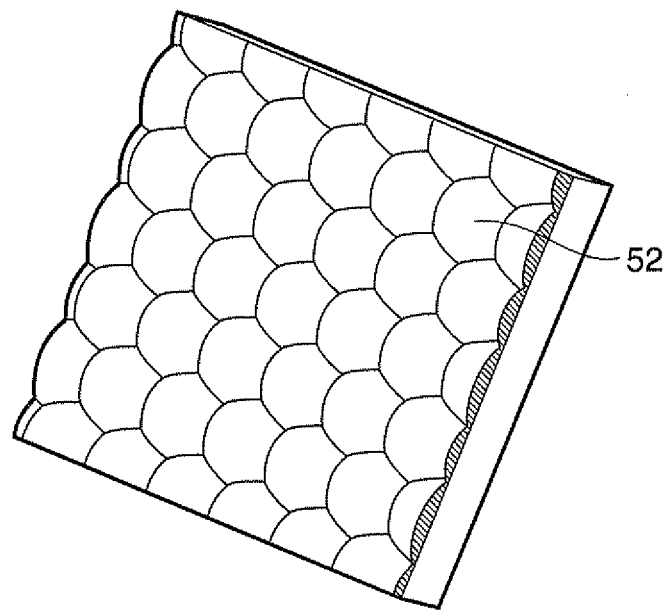
FIG. 4 is an enlarged view of a light incident surface of a transmissive diffusing unit in the first embodiment.

FIG. 4 is an enlarged view of alight incident surface of a transmissive diffusing unit 50 in the first embodiment.

In the drawings, reference characters R, G, and B denote red light, green light, and blue light, respectively.

In the present specification and drawings, components that are not directly involved in the invention (such as an enclosure) will not be described or illustrated.

The projector 1000 according to the first embodiment includes an illuminator 100, a second illuminator 200, a color separation/light guiding system 400, three liquid crystal light modulators 500R, 500G, and 500B as light modulators, a cross dichroic prism 600, and a projection system 700, as shown in FIG. 1.

The illuminator 100 includes a solid-state light source array 20, a collimator lens array 30, a light collecting system 40, a transmissive diffusing unit 50, a collimator system 60, and a lens integrator system 110. The illuminator 100 emits blue light as illumination light.

The solid-state light source array 20 is a solid-state light source group formed of a plurality of solid-state light sources and specifically includes a substrate 22 and twenty-five solid-state light sources 24, each of which emits blue light, as shown in FIGS. 1 and 2. In the solid-state light source array 20, the twenty-five solid-state light sources 24 are arranged in a matrix with five rows and five columns.

In the projector according to the first embodiment of the invention, the number of solid-state light sources is not limited to twenty-five but may be greater than one (two or more). In the solid-state light source group, the solid-state light sources may be randomly disposed.

The substrate 22 functions as a plate on which the solid-state light sources 24 are mounted. Although not described in detail, the substrate 22 has functions of relaying electric power to the solid-state light sources 24 and dissipating heat generated by the solid-state light sources 24 and other functions.

Each of the solid-state light sources 24 is a semiconductor laser that emits color light, specifically, blue light (having an emitted light intensity peak at about 460 nm, see FIG. 3A). The semiconductor laser has a rectangular light emitting region as shown in FIG. 2 and emits light more divergent in the short-side direction of the light emitting region than in the long-side direction of the light emitting region.

The collimator lens array 30 has twenty-five collimator lenses 32 (only the outermost one of the collimator lenses is labeled with the reference character) that substantially parallelize the light fluxes produced by the twenty-five solid-state light sources 24, as shown in FIG. 1. Although not described with reference to the drawings, the twenty-five collimator lenses 32 are arranged in a matrix with five rows and five columns so that they correspond to the twenty-five solid-state light sources 24. Although not described in detail, each of the collimator lenses 32 is an aspheric planoconvex lens having a hyperbolic light incident surface and a flat light exiting surface.

The collimator lenses may be randomly disposed.

The light collecting system 40 collects the light from the collimator lens array 30 (that is, the light from the solid-state light source array 20 (solid-state light source group)) at a predetermined light collection position. Although not described in detail, the light collecting system 40 is formed of an aspheric planoconvex lens having a flat light incident surface and a hyperbolic light exiting surface.

The transmissive diffusing unit 50 is disposed in the vicinity of the light collection position and transmits the light from the light collecting system 40 while diffusing the light from the light collecting system 40. The transmissive diffusing unit 50 is formed of a microlens array diffuser having a large number of microlenses 52, as shown in FIG.

4. The microlenses 52 are formed on the light incident side of the transmissive diffusing unit 50.

Each of the microlenses 52 is a convex lens. The large number of microlenses 52 are arranged with no gap therebetween at pitch of 15 μm or any other suitable value. The microlenses in the transmissive diffusing unit 50 shown in FIG. 1 are not drawn to scale but exaggerated. The same holds true in FIGS. 5, 7, 9, and 10, which will be described later.

The surface of the microlens array diffuser is coated with an AR coating. The microlens array diffuser is made of optical glass.

Although not described with reference to the drawings, the illuminator 100 is so configured that the light having passed through the transmissive diffusing unit 50 is incident on about 85% of an effective area of the lens integrator system 110.

Further, the illuminator 100 is so configured that the light from the light collecting system 40 is incident on a 0.8×0.8 mm square region of the transmissive diffusing unit 50.

The collimator system 60 is disposed on the opposite side of the light collection position to the light collecting system 40 and substantially parallelizes the light from the transmissive diffusing unit 50 (the light originally from the light collecting system 40). The collimator system 60 includes a first lens 62 and a second lens 64, as shown in FIG. 1. Each of the first lens 62 and the second lens 64 is a bi-convex lens. Each of the first lens 62 and the second lens 64 does not necessarily have the shape described above but may have any shape that allows the collimator system to substantially parallelize the light from the transmissive diffusing unit. The number of lenses that form the collimator system may alternatively be one or three or more.

In the illuminator 100, the solid-state light source array 20, the collimator lens array 30, the light collecting system 40, the transmissive diffusing unit 50, and the collimator system 60 form a light source apparatus for blue light.

The lens integrator system 110 homogenizes the in-plane light intensity distribution of the light from the collimator system 60. The lens integrator system 110 includes a first lens array 120, a second lens array 130, a polarization conversion element 140, and a superimposing lens 150.

The first lens array 120 has a plurality of first lenslets 122 that divide the light from the collimator system 60 into a plurality of sub-light fluxes, as shown in FIG. 1. The first lens array 120 functions as a light flux dividing optical element that divides the light from the collimator system 60 into a plurality of sub-light fluxes and has a configuration in which the plurality of first lenslets 122 are arranged in a matrix with multiple rows and columns in a plane perpendicular to an illumination optical axis 100ax. Although not described with reference to the drawings, the external shape of each of the first lenslets 122 is substantially similar to the external shape of an image formation region in each of the liquid crystal light modulators.

The second lens array 130 has a plurality of second lenslets 132 corresponding to the plurality of first lenslets 122 in the first lens array 120. The second lens array 130 along with the superimposing lens 150 has a function of focusing an image of each of the first lenslets 122 in the first lens array 120 in the vicinity of the image formation region of the liquid crystal light modulator 500B. The second lens array 130 has a configuration in which the plurality of second lenslets 132 are arranged in a matrix with multiple rows and columns in a plane perpendicular to the illumination optical axis 100ax.

The polarization conversion element 140 converts the polarization directions of the sub-light fluxes divided by the first lens array 120 into an aligned polarization direction and outputs substantially one type of linearly polarized sub-light fluxes.

The polarization conversion element 140 includes a polarization separation layer that transmits one of the linearly polarized components contained in the light from the collimator system 60 and reflects the other linearly polarized component in the direction perpendicular to the illumination optical axis 100ax, a reflection layer that receives the other linearly polarized component reflected off the polarization separation layer and reflects it in the direction parallel to the illumination optical axis 100ax, and a half-wave plate that converts the other linearly polarized component reflected off the reflection layer into the one linearly polarized component. The lens integrator system 110, which includes the polarization conversion element 140, outputs light having an aligned polarization direction.

The superimposing lens 150 is an optical element that collects the sub-light fluxes and superimposes them in the vicinity of the image formation region of the liquid crystal light modulator 500B. The superimposing lens 150 is so disposed that the optical axis thereof substantially coincides with the illumination optical axis 100ax. The superimposing lens may be a compound lens formed of a combination of a plurality of lenses.

The second illuminator 200 includes a second solid-state light source array 220, a collimator lens array 230, a light collecting system 240, a fluorescence producing unit 250, a collimator system 260, and a lens integrator system 310. The second illuminator 200 emits color light containing red light and green light.

The second solid-state light source array 220 includes a substrate 222 (labeled with no reference character) and twenty-five second solid-state light sources 224, each of which emits blue light as excitation light. The second solid-state light source array basically has the same configuration as that of the solid-state light source array 20 except the second solid-state light sources 224.

Each of the second solid-state light sources 224 basically has the same configuration as that of each of the solid-state light sources 24 except that the second solid-state light source 224 produces blue light (having an emitted light intensity peak at about 440 nm, see FIG. 3E) as excitation light. The solid-state light sources and the second solid-state light sources may emit blue light having the same wavelength.

The collimator lens array 230 basically has the same configuration as that of the collimator lens array 30, and the light collecting system 240 basically has the same configuration as that of the light collecting system 40. No description of the collimator lens array 230 and the light collecting system 240 will therefore be made.

The fluorescence producing unit 250 includes a transparent member 252 and a phosphor layer 254.

The transparent member 252 carries the phosphor layer 254 and is made of quartz glass, optical glass, or any other suitable material.

The side of the phosphor layer 254 that faces the light collecting system 240 may have a layer that transmits the blue light from the light collecting system 240 and reflects fluorescence light (what is called a dichroic coating).

The phosphor layer 254 contains $(Y, Gd)_3(Al, Ga)_5O_{12}$: Ce, which is a YAG-based fluorophore. Alternatively, the phosphor layer may contain any other suitable YAG-based fluorophore or any suitable fluorophore other than YAG-based fluorophores (silicate-based fluorophore or TAG-based fluorophore, for example). Still alternatively, the phosphor layer may contain a mixture of a fluorophore that converts the excitation light into red light ($CaAlSiN_3$ red fluorophore, for example) and a fluorophore that converts the excitation light into green light (β-sialon green fluorophore, for example).

The phosphor layer 254 produces fluorescence light containing red light (having an emitted light intensity peak at about 610 nm) and green light (having an emitted light intensity peak at about 550 nm) (see FIG. 3C) when irradiated with the blue light from the light collecting system 240.

The collimator system 260 basically has the same configuration as that of the collimator system 60, and no description of the collimator system 260 will be made.

In the second illuminator 200, the solid-state light source array 220, the collimator lens array 230, the light collecting system 240, the fluorescence producing unit 250, and the collimator system 260 form a light source apparatus for red light and green light.

The lens integrator system 310 basically has the same configuration as that of the lens integrator system 110, and no description of the lens integrator system 310 will be made.

The color separation/light guiding system 400 includes a dichroic mirror 410 and reflection mirrors 420, 430, and 440. The color separation/light guiding system 400 has a function of guiding the light from the illuminator 100 to the liquid crystal light modulator 500B and a function of separating the light from the second illuminator 200 into red light and green light and guiding the two color light fluxes to the liquid crystal light modulators 500R and 500G, which are illuminated with the two color light fluxes.

Light collecting lenses 450R, 450G, and 450B are disposed between the color separation/light guiding system 400 and the respective liquid crystal light modulators 500R, 500G, and 500B.

The dichroic mirror 410 is a mirror formed of a substrate on which a wavelength selection transmissive film that reflects green light and transmits red light is formed.

The reflection mirror 420 reflects the green light component.

The reflection mirror 430 reflects the red light component.

The reflection mirror 440 reflects the blue light component.

The dichroic mirror 410 separates the light from the second illuminator 200 into red light and green light.

The red light having passed through the dichroic mirror 410 is reflected off the reflection mirror 430, passes through the light collecting lens 450R, and impinges on the image formation region of the liquid crystal light modulator 500R for red light.

The green light having been reflected off the dichroic mirror 410 is further reflected off the reflection mirror 420, passes through the light collecting lens 450G, and impinges on the image formation region of the liquid crystal light modulator 500G for green light.

The light from the illuminator 100 is reflected off the reflection mirror 440, passes through the light collecting lens 450B, and impinges on the image formation region of the liquid crystal light modulator 500B for blue light.

The liquid crystal light modulators modulate the color light fluxes incident thereon in accordance with image information to form a color image. The liquid crystal light modulators 500R and 500G are illuminated with the light from the second illuminator 200, and the liquid crystal light modulator 500B is illuminated with the light from the illuminator 100. Although not illustrated, light incident-side polarizers are interposed between the collector lenses and the liquid crystal light modulators, and light exiting-side polarizers are interposed between the liquid crystal light modulators and the cross dichroic prism 600. The light incident-side polarizers, the liquid crystal light modulators, and the light exiting-side polarizers perform optical modulation on the incident color light fluxes.

Each of the liquid crystal light modulators is a transmissive liquid crystal light modulator having a light modulation region where liquid crystal molecules, an electro-optic material, are sealed and encapsulated between a pair of transparent glass substrates. For example, a polysilicon TFT is used as a switching device to modulate the polarization direction of one type of linearly polarized light having exited from the light incident-side polarizer in accordance with a given image signal.

The cross dichroic prism 600 is an optical element that combines optical images carried by color light fluxes having been modulated and outputted through the light exiting-side polarizers to form a color image. The cross dichroic prism 600 is formed by bonding four rectangular prisms and thus has a substantially square shape when viewed from the above. Dielectric multilayer films are formed along the substantially X-shaped interfaces between these bonded rectangular prisms. The dielectric multilayer film formed on one of the substantially X-shaped interfaces reflects red light, whereas the dielectric multilayer film formed on the other interface reflects blue light. These dielectric multilayer films deflect the red light and the blue light, which then travel in the same direction as the green light, so that the three color light fluxes are combined.

The color image having exited from the cross dichroic prism 600 is enlarged and projected through the projection system 700 and forms an image on a screen SCR.

A description will next be made of advantageous effects provided by the illuminator 100 and the projector 1000 according to the first embodiment.

The illuminator 100 according to the first embodiment, which includes the solid-state light source group formed of a plurality of solid-state light sources 24 (solid-state light source array 20) and the transmissive diffusing unit 50 that transmits the light from the light collecting system 40 while diffusing the light from the light collecting system 40, can diffuse spot-shaped light and then deliver the diffused light to the lens integrator system 110, whereby the illuminator 100 can satisfy both of the following requirements: producing high-intensity illumination light and producing the illumination light with high efficiency along with little brightness unevenness.

Further, the illuminator 100 according to the first embodiment, which includes the transmissive diffusing unit 50 formed of a microlens array diffuser, can reduce the amount of light loss resulting from the use of the transmissive diffusing unit and hence further increase the light use efficiency.

Moreover, the illuminator 100 according to the first embodiment, which includes an AR-coated microlens array diffuser, can further reduce the amount of backward scattering and increase the light use efficiency.

Further, the illuminator 100 according to the first embodiment, which includes a microlens array diffuser made of an inorganic material (optical glass), can enhance heat resistance of the transmissive diffusing unit 50 and hence make the illuminator more reliable.

Further, the illuminator 100 according to the first embodiment, which is so configured that the light having passed through the transmissive diffusing unit 50 is incident on at least 50% of the effective area of the lens integrator system 110, can further increase the uniformity of the produced illumination light.

Further, the illuminator 100 according to the first embodiment, in which each of the solid-state light sources 24 is a semiconductor laser, can be a compact and high-intensity illuminator. The illuminator 100 can output more intense illumination light by arranging the plurality of solid-state light sources 24 in a more densely manner.

Further, the illuminator 100 according to the first embodiment, in which the light from the light collecting system 40 is incident on a 1×1 mm square region of the transmissive diffusing unit 50 or the area of the transmissive diffusing unit 50 on which the light from the light collecting system 40 is incident is sufficiently small, can prevent the light use efficiency in the illuminator from decreasing due to the use of the plurality of solid-state light sources 24.

The projector 1000 according to the first embodiment, which includes the illuminator 100 according to the first embodiment capable of satisfying both of the following requirements: producing high-intensity illumination light and producing the illumination light with high efficiency along with little brightness unevenness, can project a projection image of high intensity with little brightness unevenness.

The projector 1000 according to the first embodiment, which includes the second illuminator 200 including the second solid-state light sources 224 that produce excitation light (blue light) and the phosphor layer 254 that produces fluorescence light (red light and green light) when excited with the excitation light produced by the second solid-state light sources 224, and in which the light from the second illuminator 200 is modulated by the corresponding light modulators (liquid crystal light modulators 500R and 500G) in accordance with image information, can project a high-intensity color image formed of desired color light components.

Second Embodiment

Figure 5:
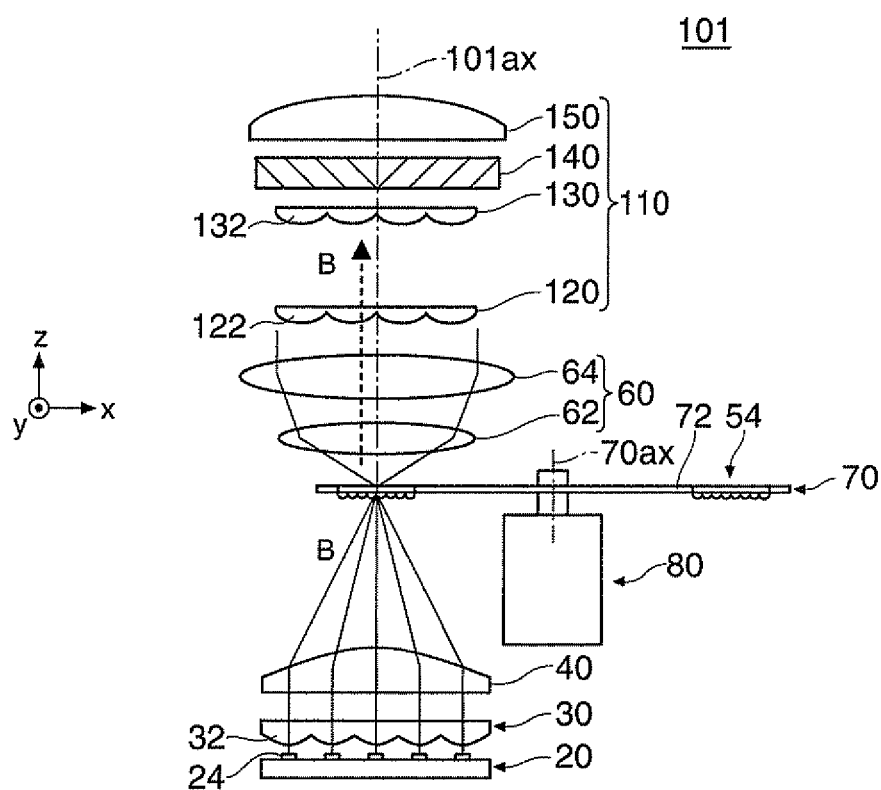
FIG. 5 is a plan view showing the optical system of an illuminator according to a second embodiment.

FIG. 5 is a plan view showing the optical system of an illuminator 101 according to a second embodiment.

Figure 6:
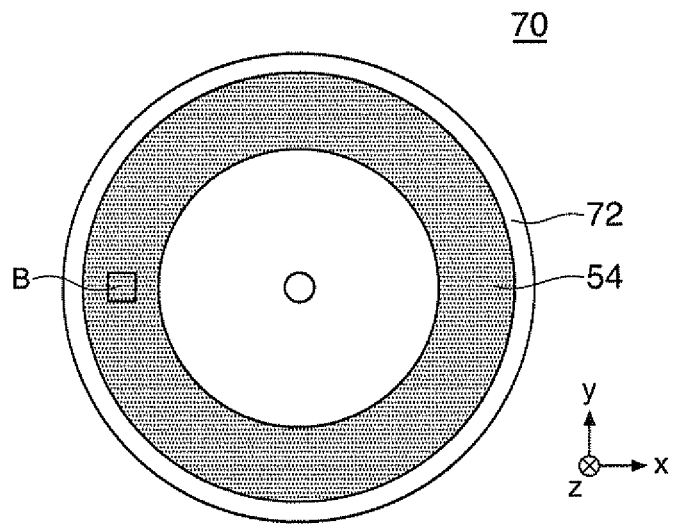
FIG. 6 shows a rotary plate in the second embodiment viewed from the side where a driver is present.

FIG. 6 shows a rotary plate 70 in the second embodiment viewed from the side where a driver 80 is present. In FIG. 6, the symbol labeled with the reference character B is a square each side of which is 0.8 mm in length. The light collecting system 40 illuminates a transmissive diffusing unit 54 with light having a shape of the square such that the area which is illuminated by the light collecting system 40 is included in the square labeled with the reference character B. The same holds in FIGS. 11 to 13 described below, in which a reference character with which a square is labeled represents the color of the light incident on the transmissive diffusing unit.

The illuminator 101 according to the second embodiment basically has the same configuration as that of the illuminator 100 according to the first embodiment but differs therefrom in that a rotary plate and a driver are provided. That is, the illuminator 101 according to the second embodiment further includes a rotary plate 70 that is disposed in the vicinity of the light collection position and can be rotated by a driver 80 around a predetermined axis of rotation 70ax, and the transmissive diffusing unit 54 is at least so positioned on the rotary plate 70 that the light from the light collecting system 40 passes through the transmissive diffusing unit 54, as shown in FIGS. 5 and 6.

The rotary plate 70 includes a rotary substrate 72 and the transmissive diffusing unit 54.

The rotary substrate 72 supports the transmissive diffusing unit 54, and a central portion of the rotary substrate 72 is connected to the driver 80.

The transmissive diffusing unit 54 basically has the same configuration as that of the transmissive diffusing unit 50 in the first embodiment but has a ring-like shape so that it can fit with the rotary plate 70, as shown in FIG. 6. The light from the light collecting system 40 is therefore always incident on the transmissive diffusing unit 54, which rotates with the rotary plate 70.

The driver 80 is disposed on the same side of the rotary plate 70 as the side on which the light from the light collecting system 40 is incident, as shown in FIG. 5. The driver 80 has a substantially cylindrical shape, and a rotary portion (labeled with no reference character) of the driver 80 is directly attached to the center of the rotary substrate 72 around which it is rotated. The driver 80 is, for example, formed of a motor.

The rotary portion of the driver may alternatively be attached to the rotary plate via a belt or any other suitable interposable component.

As described above, the illuminator 101 according to the second embodiment, which differs from the illuminator 100 according to the first embodiment in that the rotary plate and the driver are provided, still includes the solid-state light source group formed of a plurality of solid-state light sources 24 (solid-state light source array 20) and the transmissive diffusing unit 54 that transmits the light from the light collecting system 40 while diffusing the light from the light collecting system 40, whereby spot-shape light can be diffused and then delivered to the lens integrator system 110. As a result, the illuminator 101 can satisfy both of the following requirements: producing high-intensity illumination light and producing the illumination light with high efficiency along with little brightness unevenness, as in the case of the illuminator 100 according to the first embodiment.

Further, the illuminator 101 according to the second embodiment, which includes the rotary plate 70 and in which the transmissive diffusing unit 54 is at least so positioned on the rotary plate 70 that the light from the light collecting system 40 passes through the transmissive diffusing unit 54, allows the position where the light is incident to be moved over a wide range of the light incident surface of the transmissive diffusing unit 54, whereby the thermal load applied to a unit area of the transmissive diffusing unit 54 can be reduced, which prevents the transmissive diffusing unit 54 from being degraded or damaged due to heat.

Further, the illuminator 101 according to the second embodiment can reduce the amount of speckle noise in the illumination light.

Further, the illuminator 101 according to the second embodiment, which basically has the same configuration as that of the illuminator 100 according to the first embodiment except that the rotary plate and the driver are provided, can still provide the relevant ones of the advantageous effects provided by the illuminator 100 according to the first embodiment.

Third Embodiment

Figure 7:
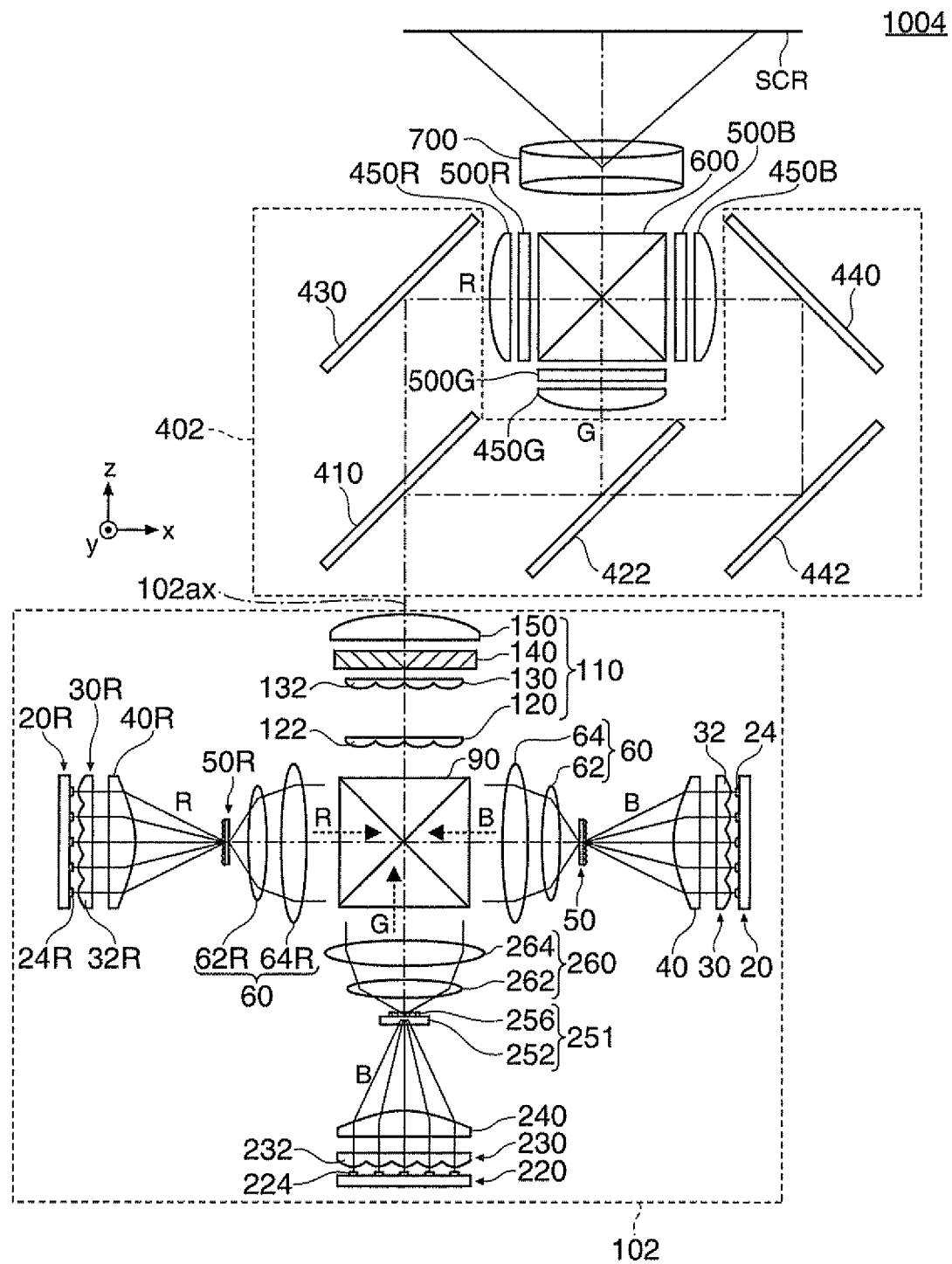
FIG. 7 is a plan view showing the optical system of a projector according to a third embodiment.

FIG. 7 is a plan view showing the optical system of a projector 1004 according to a third embodiment.

Figure 8A:
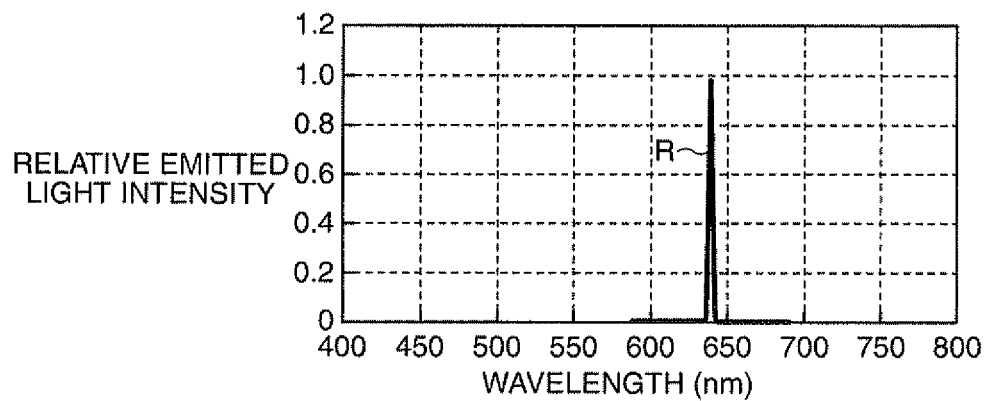
FIGS. 8A and 8B show graphs illustrating intensity characteristics of light emitted from a solid-state light source and a fluorophore in the third embodiment.
Figure 8B:
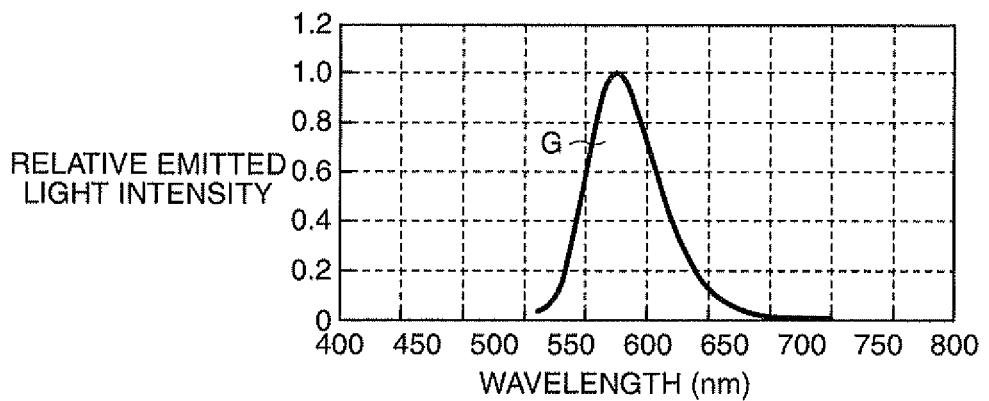

FIGS. 8A and 8B show graphs illustrating intensity characteristics of light emitted from a solid-state light source 24R and intensity characteristics of light emitted from a phosphor in the third embodiment. FIG. 8A shows a graph illustrating the intensity characteristic of light emitted from the solid-state light source 24R. FIG. 8B shows a graph illustrating the intensity characteristic of light emitted from a phosphor contained in a phosphor layer 256.

An illuminator 102 according to the third embodiment basically has the same configuration as that of the illuminator 100 according to the first embodiment but differs therefrom in that alight source apparatus for red light, a light source apparatus for green light, and a cross dichroic prism are provided, and accordingly the projector 1004 according to the third embodiment includes no second illuminator and has a differently configured color separation/light guiding system. The illuminator 102 and a color separation/light guiding system 402 will be described below.

A solid-state light source array 20, a collimator lens array 30, a light collecting system 40, a transmissive diffusing unit 50, and a collimator system 60, which form a light source apparatus for blue light, are configured in the same manner as the solid-state light source array 20, the collimator lens array 30, the light collecting system 40, the transmissive diffusing unit 50, and the collimator system 60 in the first embodiment. No descriptions of the components described above in the third embodiment will therefore be made.

A solid-state light source array 20R, a collimator lens array 30R, a light collecting system 40R, a transmissive diffusing unit 50R, and a collimator system 60R, which form a light source apparatus for red light, are basically configured in the same manner as the solid-state light source array 20, the collimator lens array 30, the light collecting system 40, the transmissive diffusing unit 50, and the collimator system 60 except the configuration of each of the solid-state light sources.

Solid-state light sources 24R are basically configured in the same manner as the solid-state light sources 24 except that the emitted color light is red light (having an emitted light intensity peak at about 640 nm, see FIG. 8B).

A solid-state light source array 220, a collimator lens array 230, a light collecting system 240, a fluorescence producing unit 251, and a collimator system 260, which form a light source apparatus for green light, are basically configured in the same manner as the solid-state light source array 220, the collimator lens array 230, the light collecting system 240, the fluorescence producing unit 250, and the collimator system 260 in the second illuminator 200 according to the first embodiment except the configuration of the fluorescence producing unit.

The fluorescence producing unit 251 basically has the same configuration as that of the fluorescence producing unit 250 in the first embodiment except that the fluorescence producing unit 251 has a phosphor layer 256 that produces fluorescence light containing green light (having an emitted light intensity peak at about 570 nm, see FIG. 8B) when excited with the blue light from the light collecting system 40.

The phosphor layer 256 contains a phosphor that converts blue light into green light (β-sialon green fluorophore, for example).

The cross dichroic prism 90 is an optical element that combines light fluxes from the RGB light source apparatus and basically has the same configuration as that of the cross dichroic prism 600.

The color separation/light guiding system 402 basically has the same configuration as that of the color separation/light guiding system 400 in the first embodiment but includes a dichroic mirror 422 instead of the reflection mirror 420 and further includes a reflection mirror 442.

The dichroic mirror 422 reflects green light and transmits blue light.

The reflection mirror 442 reflects blue light.

In the optical path from the dichroic mirror 422 to the reflection mirror 440, a relay lens for preventing decrease in light use efficiency resulting from light divergence and other factors may be provided.

As described above, the illuminator 102 according to the third embodiment, which differs from the illuminator 100 according to the first embodiment in that the light source apparatus for red light, the light source apparatus for green light, and the cross dichroic prism are provided, still includes the solid-state light source groups formed of a plurality of solid-state light sources 24 and 24R (solid-state light source arrays 20 and 20R) and the transmissive diffusing units 50 and 50R that transmit the light from the light collecting systems 40 and 40R while diffusing the light, whereby spot-shaped light can be diffused and then delivered to the lens integrator system 110. As a result, the illuminator 102 can satisfy both of the following requirements: producing high-intensity illumination light and producing the illumination light with high efficiency along with little brightness unevenness, as in the case of the illuminator 100 according to the first embodiment.

Since the illuminator 102 according to the third embodiment has the same configuration as that of the illuminator 100 according to the first embodiment except that the light source apparatus for red light, the light source apparatus for green light, and the cross dichroic prism are provided, the same advantageous effects provided by the illuminator 100 according to the first embodiment can be provided.

The projector 1004 according to the third embodiment, which differs from the projector 1000 according to the first embodiment in that no second illuminator is provided and the illuminator and the color separation/light guiding system are configured differently but still includes the illuminator 102 according to the third embodiment capable of satisfying both of the following requirements: producing high-intensity illumination light and producing the illumination light with high efficiency along with little brightness unevenness, can project a projection image of high intensity with little brightness unevenness, as in the case of the projector 1000 according to the first embodiment.

The projector 1004 according to the third embodiment, in which the illuminator 102 includes the second solid-state light sources 224 that produces excitation light (blue light), the phosphor layer 256 that produces fluorescence light (green light) when excited with the excitation light produced by the second solid-state light sources 224, and a plurality of solid-state light source groups that produce different color light fluxes (solid-state light source arrays 20 and 20R), can project a high-intensity color image formed of desired color light components.

The invention has been described with reference to the above embodiments, but the invention is not limited thereto. The invention can be implemented in a variety of other aspects that do not depart from the substance of the invention. For example, the following variations are conceivable.

Figure 9:
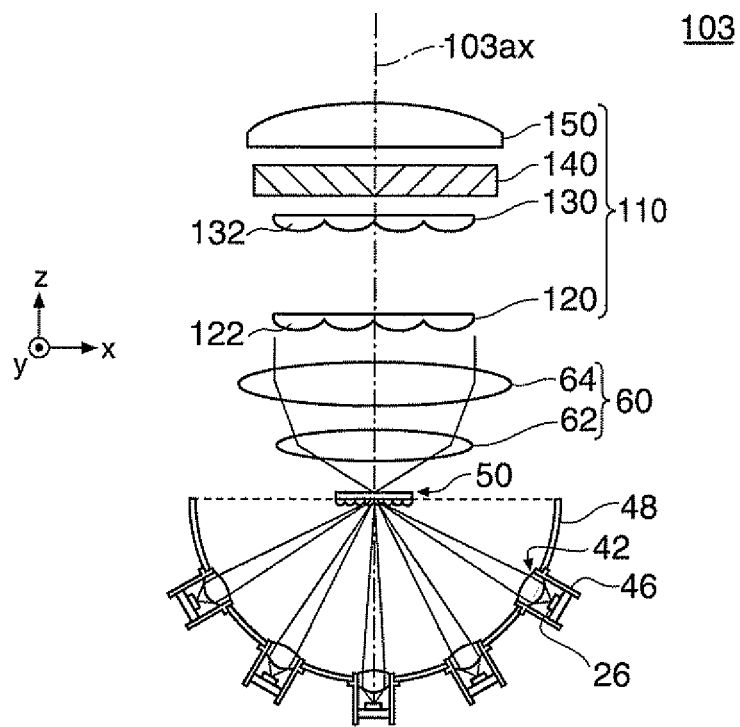
FIG. 9 is a plan view showing the optical system of an illuminator according to a first variation.

In each of the embodiments described above, the solid-state light source group and the light collecting system are formed of a single solid-state light source array and a single light collecting system (light collecting lens), but the invention is not necessarily configured this way. For example, the solid-state light source group and the light collecting system may be formed of a plurality of solid-state light sources and a plurality of light collecting systems, as shown in FIG. 9. FIG. 9 is a plan view showing the optical system of an illuminator 103 according to a first variation. The illuminator 103 includes a plurality of solid-state light sources 26 (only the rightmost one is labeled with a reference character) as the solid-state light source group and a plurality of light collecting systems 42 (only the rightmost one is labeled with a reference character) as the light collecting system, as shown in FIG. 9. The solid-state light sources 26 and the light collecting systems 42 are paired, and each pair is fixed to a tubular holder 46 (only the rightmost one is labeled with a reference character). The holders 46 are fixed to a hemispherical fixture 48. As described above, the solid-state light source group and the light collecting system may be formed of a plurality of solid-state light sources and a plurality of light collecting systems.

Figure 10:
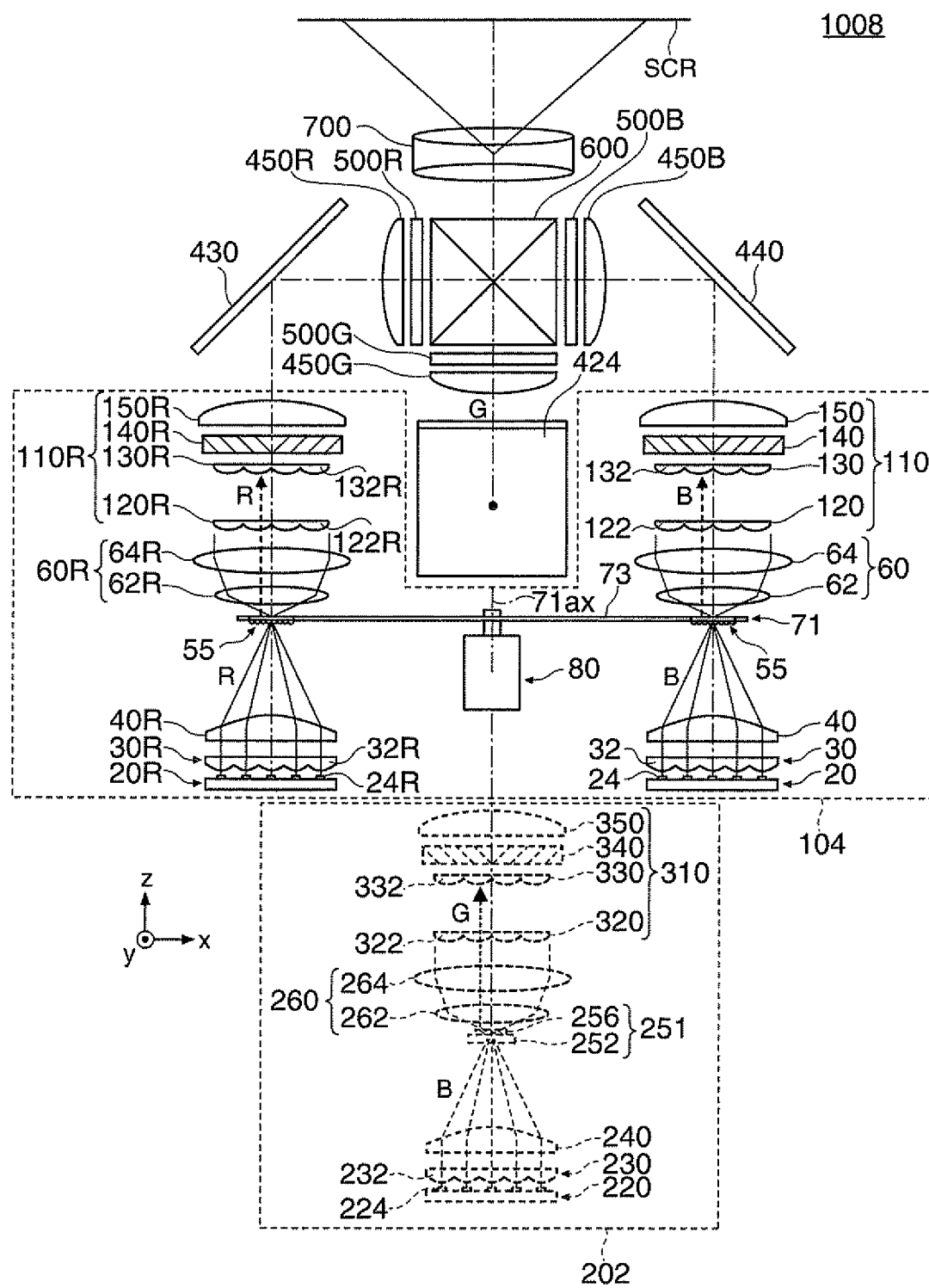
FIG. 10 is a plan view showing the optical system of a projector according to a second variation.
Figure 11:
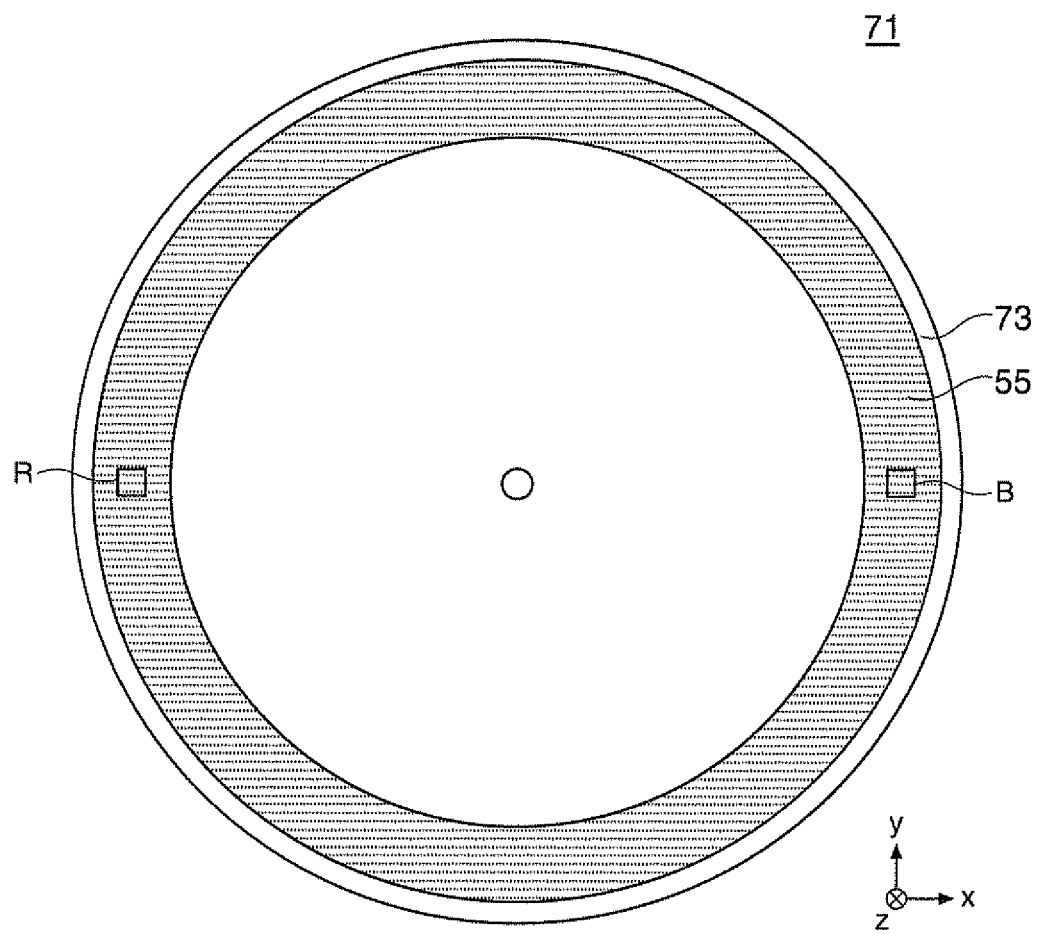
FIG. 11 shows a rotary plate in the second variation viewed from the side where a driver is present.

2. In each of the embodiments described above, a single light collecting system is paired with a single transmissive diffusing unit, but the invention is not necessarily configured this way. For example, two light collecting systems may share a single transmissive diffusing unit, as shown in FIGS. 10 and 11. FIG. 10 is a plan view showing the optical system of a projector 1008 according to a second variation. FIG. 11 shows a rotary plate 71 in the second variation viewed from the side where a driver is present. As shown in FIGS. 10 and 11, a transmissive diffusing unit 55 in an illuminator 104 according to the second variation transmits blue light from a light collecting system 40 while diffusing the blue light from a light collecting system 40, and further transmits red light from a light collecting system 40R while diffusing the red light from a light collecting system 40R. In the projector 1008 according to the second variation, a second illuminator 202 (indicated by dotted lines) that emits green light is disposed farther away from the viewer than the illuminator 104, and the green light from the second illuminator 202 enters a light collecting lens 450G after traveling along the optical path deflected by a group of reflection mirrors 424. As described above, two light collecting systems may share one transmissive diffusing unit.

Figure 12:
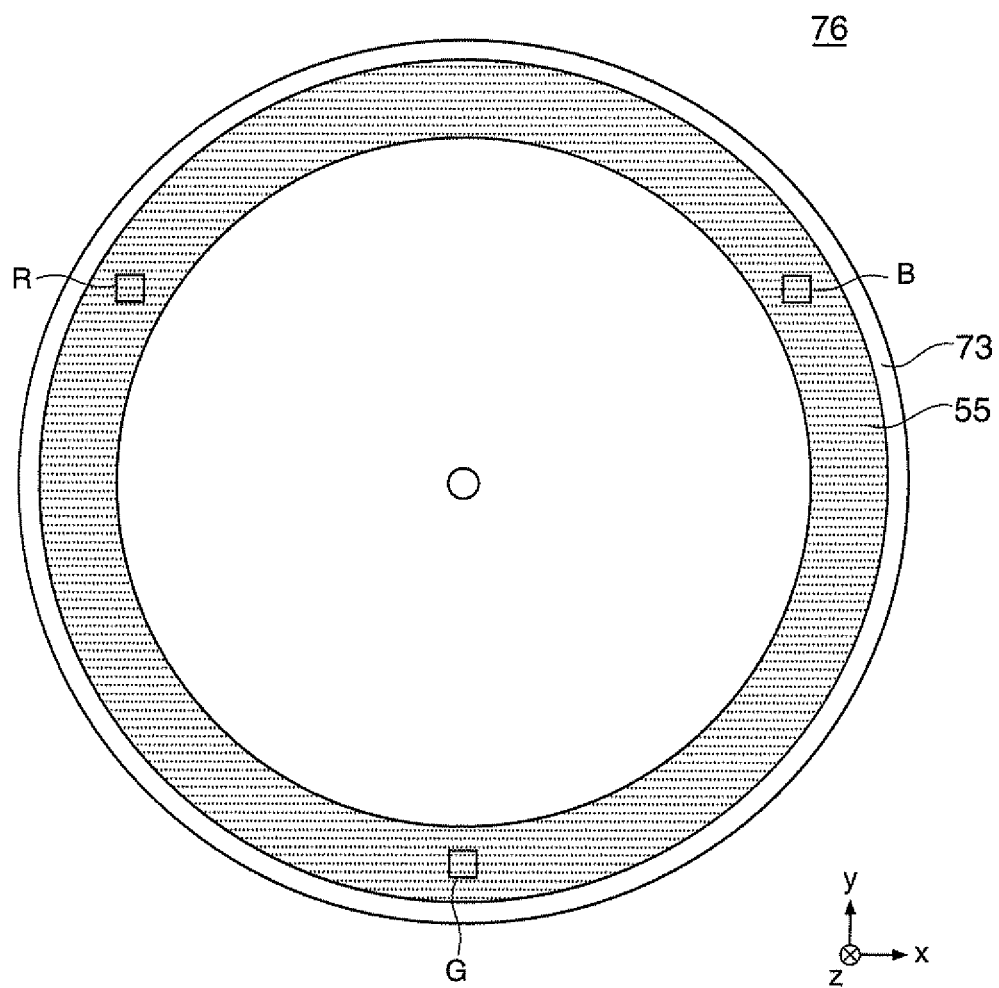
FIG. 12 shows a rotary plate in a third variation viewed from the side where a driver is present.

3. In each of the embodiments described above, green light is produced by a phosphor layer, but the invention is not necessarily configured this way. Green light may be produced by a solid-state light source. FIG. 12 shows a rotary plate 76 in a third variation viewed from the side where a driver is present. In this case, three light collecting systems may share one transmissive diffusing unit, as shown in FIG. 12. Further, three or more light collecting systems may share one transmissive diffusing unit.

Figure 13:
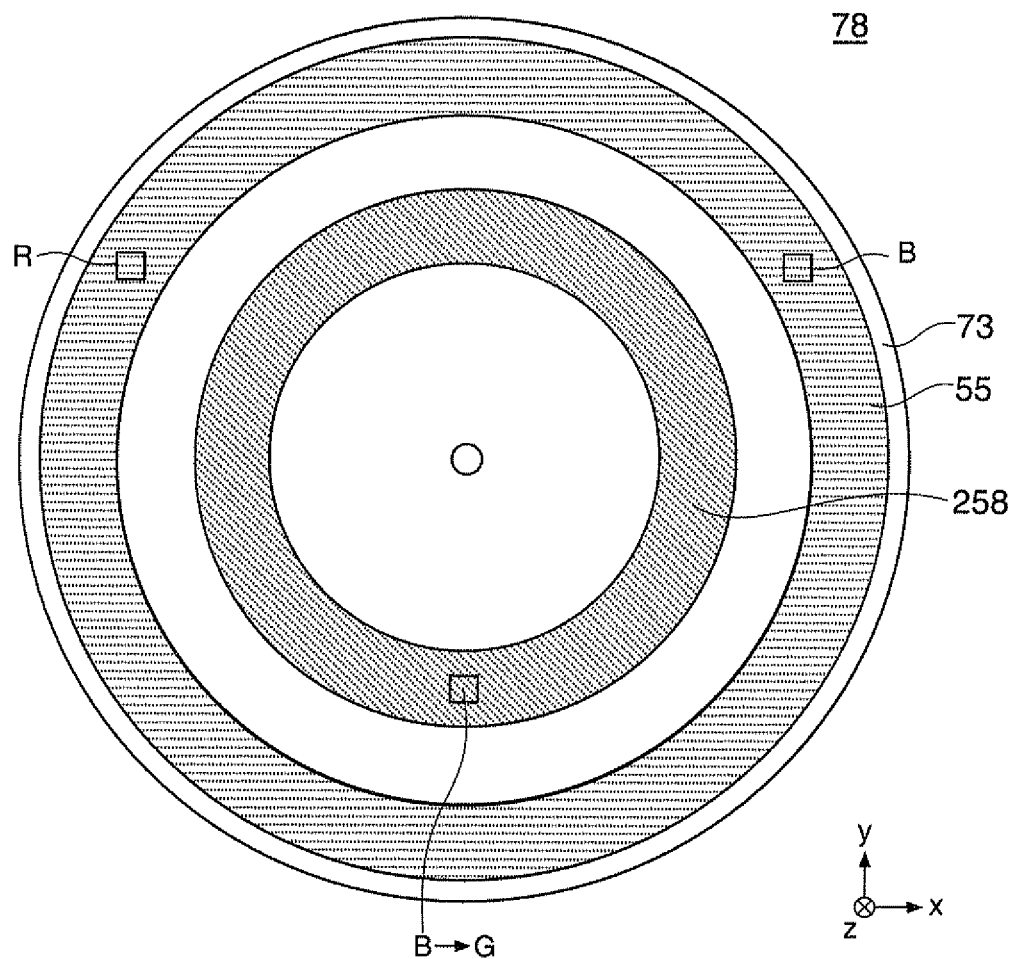
FIG. 13 shows a rotary plate in a fourth variation viewed from the side where a driver is present.

4. In the second embodiment described above, the rotary plate 70 has the transmissive diffusing unit 54, but the invention is not necessarily configured this way. FIG. 13 shows a rotary plate 78 in the fourth variation viewed from the side where a driver is present. Reference character 258 denotes a fluorescence light producing unit that produces green light when excited with blue light. For example, a rotary plate may have a fluorescence light producing unit as well as a transmissive diffusing unit, as shown in FIG. 13.

Figure 14:
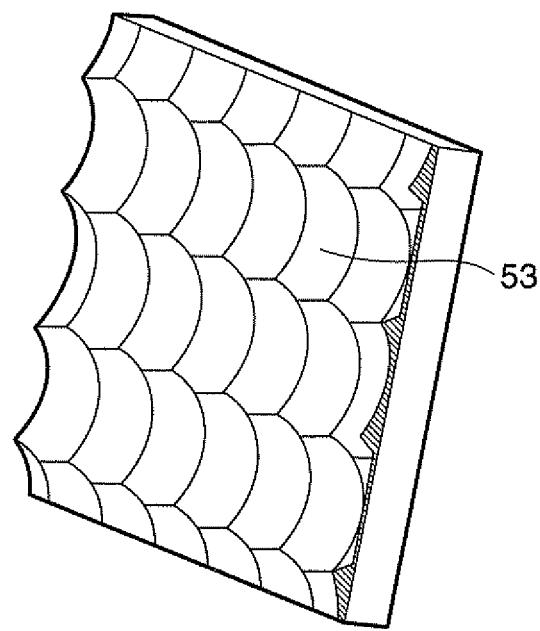
FIG. 14 is an enlarged view of a light incident surface of a transmissive diffusing unit (not shown) in a fifth variation.

5. In each of the embodiments described above, the transmissive diffusing unit is formed of convex microlenses (microlens array diffuser), but the invention is not necessarily configured this way. FIG. 14 is an enlarged view of a light incident surface of a transmissive diffusing unit 58 (not shown) in a fifth variation. Reference character 53 denotes a concave microlens. The transmissive diffusing unit may be formed of concave microlenses (microlens array diffuser), as shown in FIG. 14.

6. In each of the embodiments described above, the transmissive diffusing unit is formed of a microlens array diffuser, but the invention is not necessarily configured this way. For example, the transmissive diffusing unit may be formed of a holographic diffuser. Such a configuration also allows the amount of light loss resulting from the use of the transmissive diffusing unit to be reduced, whereby the light use efficiency can be further increased.

7. In each of the embodiments described above, the microlens array diffuser has microlenses formed on the light incident surface thereof, but the invention is not necessarily configured this way. Alternatively, the microlens array diffuser may have microlenses formed on the light exiting surface thereof or may have microlenses formed on both the light incident and exiting surfaces thereof.

8. In each of the embodiments described above, the collimator lens is formed of an aspheric planoconvex lens having a hyperbolic light incident surface and a flat light exiting surface, but the invention is not necessarily configured this way. For example, the collimator lens may alternatively be formed of an aspheric planoconvex lens having a flat light incident surface and a spheroidal light exiting surface. Still alternatively, the collimator lens formed of a single lens may be replaced with a collimator lens formed of a plurality of lenses. In short, any collimator lens provided to correspond to a solid-state light source or a second solid-state light source and capable of substantially parallelizing the light produced by the solid-state light source or the second solid-state light source may be used.

9. In each of the embodiments described above, the light collecting system is formed of an aspheric planoconvex lens having a flat light incident surface and a hyperbolic light exiting surface, but the invention is not necessarily configured this way. For example, the light collecting system may alternatively be formed of an aspheric planoconvex lens having a spheroidal light incident surface and a flat light exiting surface. Still alternatively, the light collecting system formed of a single lens may be replaced with a light collecting system formed of a plurality of lenses. In short, any light collecting system capable of collecting the light from the collimator lens array in a predetermined light collection position may be used.

10. In each of the embodiments described above, each of the solid-state light sources and the second solid-state light sources is a semiconductor laser, but the invention is not necessarily configured this way. For example, each of the solid-state light sources and the second solid-state light sources may be a light emitting diode.

11. In each of the embodiments described above, the projector is a transmissive projector, but the invention is not necessarily configured this way. For example, the projector may be a reflective projector. The word "transmissive" used herein means that the light modulator as a light modulation unit is of light-transmissive type, such as a transmissive liquid crystal light modulator, and the word "reflective" used herein means that the light modulator as the light modulation unit is of light-reflective type, such as a reflective liquid crystal light modulator. When the invention is applied to a reflective projector, the same advantageous effects as those provided by a transmissive projector can also be provided.

12. The first embodiment has been described with reference to a projector using three light modulators, but the invention is not limited thereto. The invention is also applicable to a projector using one light modulator, a projector using two light modulators, and a projector using four or more light modulators.

13. The invention is applicable not only to a front projection projector that projects a projection image from the observation side but also to a rear projection projector that projects a projection image from the side opposite the observation side.

14. In each of the embodiments described above, each light modulator in the projector is a liquid crystal light modulator, but the invention is not necessarily configured this way. The light modulator may, in general, be any device that modulates incident light in accordance with image information, and a micromirror light modulator may alternatively be used. An example of the micromirror light modulator may include a DMD (digital micromirror device: a trademark of Texas Instruments Incorporated).

15. Each of the above embodiments has been described with reference to the case where the illuminator according to any of the embodiments is used in a projector, but the invention is not necessarily configured this way. For example, the illuminator according to any of the embodiments of the invention may be used in other optical apparatus (for example, an optical disc apparatus, an automobile headlamp, and an illumination apparatus).

What is claimed is:

1. An illuminator comprising:
   a solid-state light source group including an array of solid-state light sources, the array defining a light source area;
   a light collecting system that focuses light from the solid-state light source group at a predetermined light collection position;
   a collimator system disposed on the opposite side of the light collection position to the light collecting system, the collimator system including a lens, the predetermined light collection position where the light from the solid-state light source group is focused being located between the light collecting system and the collimator system;
   a transmissive diffusing unit disposed in the vicinity of the light collection position, the transmissive diffusing unit having a light receiving area that receives light from the light collecting system and transmitting the light from the light collecting system while diffusing the light, the light receiving area being smaller than the light source area, the light from the solid-state light source group being incident on the transmissive diffusing unit in a form of dappled light; and
   a lens integrator system on which light having passed through the transmissive diffusing unit is incident.

2. The illuminator according to claim 1,
   wherein the transmissive diffusing unit is formed of a microlens array diffuser.

3. The illuminator according to claim 1,
   wherein the transmissive diffusing unit is formed of a holographic diffuser.

4. The illuminator according to claim 1,
   wherein the light having passed through the transmissive diffusing unit is incident on at least 50% of an effective area of the lens integrator system.

5. The illuminator according to claim 1,
   wherein each of the solid-state light sources is a semiconductor laser.

6. The illuminator according to claim 1
   further comprising a rotary plate disposed in the vicinity of the light collecting position and rotatable around a predetermined axis of rotation by using a driver,
   wherein the transmissive diffusing unit is at least so positioned on the rotary plate that the light from the light collecting system passes through the transmissive diffusing unit.

7. The illuminator according to claim 1,
   wherein the light from the light collecting system is incident on a 1×1 mm square region of the transmissive diffusing unit.

8. The illuminator according to claim 1, wherein the light sources provide parallel light beams and the light collecting system changes the parallel light beams to convergent beams.

9. The illuminator according to claim 1, wherein the light sources are arranged on a flat substrate.

10. A projector comprising:
    an illuminator;
    a light modulator that modulates light from the illuminator in accordance with image information; and
    a projection system that projects light from the light modulator,
    wherein the illuminator includes
    a solid-state light source group including an array of solid-state light sources, the array defining a light source area;
    a light collecting system that focuses light from the solid-state light source group at a predetermined light collection position,
    a collimator system disposed on the opposite side of the light collection position to the light collecting system, the collimator system including a lens, the predetermined light collection position where the light from the solid-state light source group is focused being located between the light collecting system and the collimator system,
    a transmissive diffusing unit disposed in the vicinity of the light collection position, the transmissive diffusing unit having a light receiving area that receives light from the light collecting source and transmitting the light from the light collecting system while diffusing the light, the light receiving area being smaller than the light source area, the light from the solid-state light source group being incident on the transmissive diffusing unit in a form of dappled light; and
    a lens integrator system on which light having passed through the transmissive diffusing unit is incident.

11. The projector according to claim 10, wherein the light sources are arranged on a flat substrate.

12. The projector according to claim 10, wherein the light sources provide parallel light beams and the light collecting system changes the parallel light beams to convergent beams.

13. The projector according to claim 10,
    wherein the transmissive diffusing unit is formed of a microlens array diffuser.

14. The projector according to claim 10,
    wherein the transmissive diffusing unit is formed of a holographic diffuser.

15. The projector according to claim 10,
    wherein the light having passed through the transmissive diffusing unit is incident on at least 50% of an effective area of the lens integrator system.

16. The projector according to claim 10,
    wherein each of the solid-state light sources is a semiconductor laser.

17. The projector according to claim 10,
further comprising a rotary plate disposed in the vicinity of the light collecting position and rotatable around a predetermined axis of rotation by using a driver,
wherein the transmissive diffusing unit is at least so positioned on the rotary plate that the light from the light collecting system passes through the transmissive diffusing unit.

18. The projector according to claim 10, further comprising:
a second illuminator; and
a second light modulator that modulates light from the second illuminator in accordance with image information,
wherein the second illuminator includes a second solid-state light source that produces excitation light and a phosphor layer that produces fluorescence light when excited with the excitation light produced by the second solid-state light source.

19. The projector according to claim 10, further comprising:
a second solid-state light source group; and
a third light modulator that modulates light from the second solid-state light source group in accordance with image information,
wherein the color of the light from the second solid-state light source group differs from the color of the light from the solid-state light source group.

* * * * *